United States Patent [19]

Tibbits

[11] 4,005,313

[45] Jan. 25, 1977

[54] AUTOMOTIVE TRAILER LIGHT ADAPTER

[75] Inventor: Richard Paul Tibbits, Rochester, N.Y.

[73] Assignee: The Raymond Lee Organization, Inc., New York, N.Y.; a part interest

[22] Filed: May 14, 1975

[21] Appl. No.: 577,431

[52] U.S. Cl. .............................. 307/10 R; 280/422
[51] Int. Cl.² ...................................... B60D 1/08
[58] Field of Search ......... 280/422, 417; 307/10 R, 307/10 LS

[56] References Cited
UNITED STATES PATENTS

| 2,660,679 | 11/1953 | Hunt | 307/10 R |
| 2,989,645 | 6/1961 | Frieden | 307/10 R |

Primary Examiner—Herman Hohauser
Attorney, Agent, or Firm—Daniel Jay Tick

[57] ABSTRACT

A wire for the running lights of a towing vehicle is connected to a wire for the running lights of a trailer. A chassis ground wire of the vehicle is connected to a trailer ground wire of the trailer. A relay circuit connects a right turn signal wire of the vehicle, a left turn signal wire of the vehicle and a brake wire of the vehicle to a combination right turn signal and brake wire of the trailer and a combination left turn signal and brake wire of the trailer.

4 Claims, 2 Drawing Figures

AUTOMOTIVE TRAILER LIGHT ADAPTER

DESCRIPTION OF THE INVENTION

The present invention relates to an automotive trailer light adapter. More particularly, the invention relates to an automotive trailer light adapter for adapting an automotive trailer having a four wire tail light configuration to a towing vehicle having a five wire tail light configuration.

Objects of the invention are to provide an automotive trailer light adapter of simple structure, which is inexpensive in manufacture, installable and removable with facility and convenience, and functions efficiently, effectively and reliably to adapt an automotive trailer having a four wire light configuration such as, for example, a utility, boat, motorcycle, snowmobile or camper trailer, to a towing vehicle having a five wire tail light configuration such as, for example, a foreign car.

Figure 1:
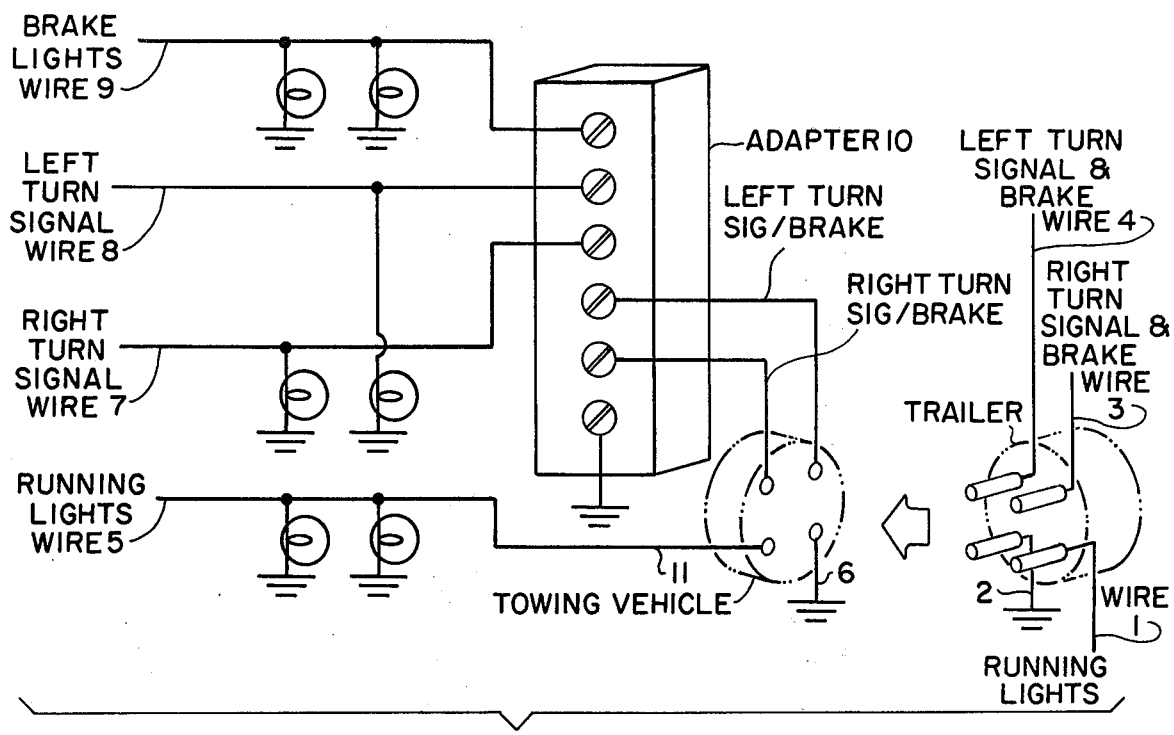
Figure 2:
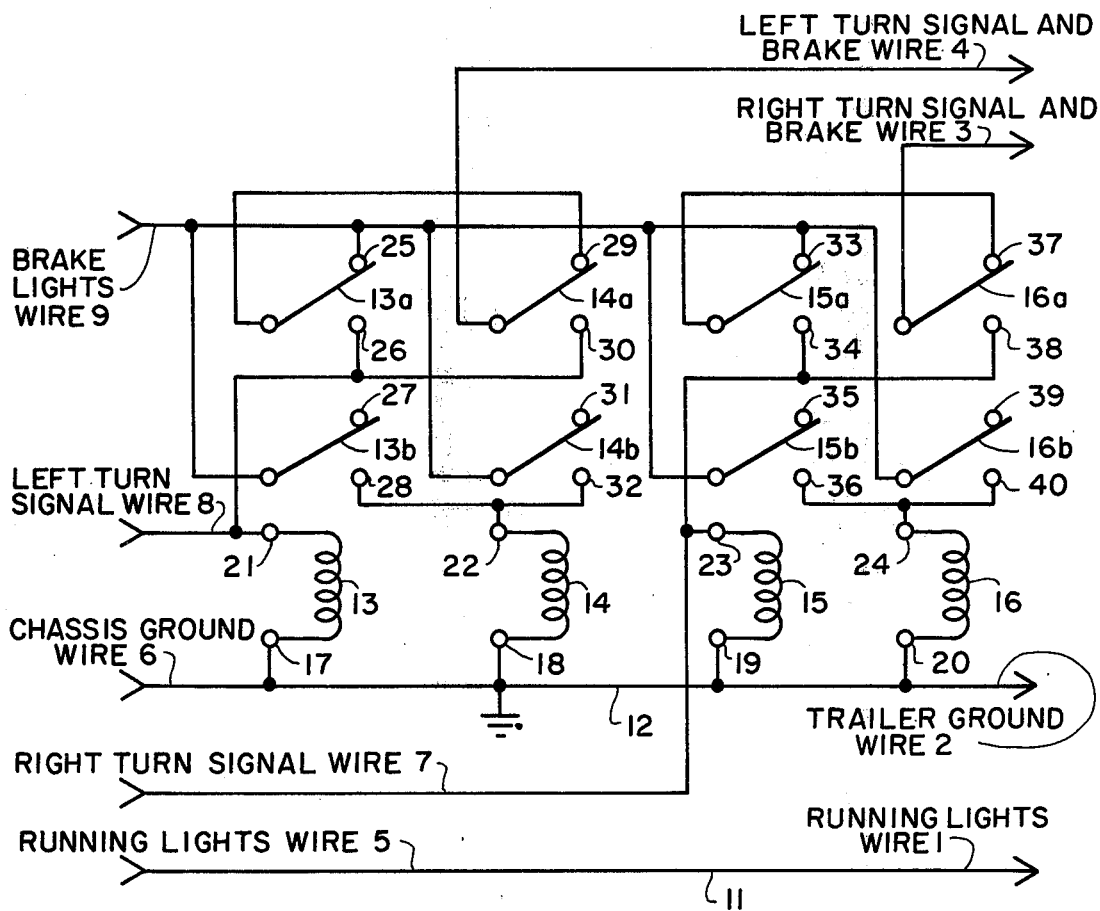

In order that the invention may be readily carried into effect, it will now be described with reference to the accompanying drawing, wherein:

FIG. 1 is a block diagram of an embodiment of the automotive trailer light adapter of the invention; and FIG. 2 is a circuit diagram of the automotive trailer light adapter of the invention.

The automotive trailer light adapter of the invention adapts an automotive trailer having a four-wire tail light configuration having a running lights wire 1, a trailer ground wire 2, a combination right turn signal and brake wire 3 and a combination left turn signal and brake wire 4 to a towing vehicle having a five wire tail light configuration having a running lights wire 5, a chassis ground wire 6, a right turn signal wire 7, a left turn signal wire 8 and a brake lights wire 9.

The automotive trailer light adapter 10 (FIG. 1) of the invention comprises a lead 11 for connecting the running lights wire 5 of the towing vehicle to the running lights wire 1 of the trailer.

A ground lead 12 connects the chassis ground wire 6 of the vehicle to the trailer ground wire 2 of the trailer.

In accordance with the invention, a relay circuit, as shown in FIG. 2, connects the right turn signal wire 7 of the vehicle, the left turn signal wire 8 of the vehicle and the brake lights wire 9 of the vehicle to the combination right turn signal and brake wire 3 of the trailer and the combination left turn signal and brake wire 4 of the trailer.

The relay circuit comprises four relay energizing windings 13, 14, 15 and 16. The relay energizing windings 13, 14, 15 and 16 have one end 17, 18, 19 and 20, respectively, connnected to the ground lead 12. The other end 23 of the relay energizing winding 15 is connected to the right turn signal wire 7. The other end 21 of the relay energizing winding 13 is connected to the left turn signal wire 8. The relay circuit further comprises four pairs of double pole double throw relay contacts.

A first pair of relay contacts comprising an armature 13a and fixed contacts 25 and 26, and an armature 13b and fixed contacts 27 and 28, are controlled in operation by the relay energizing winding 13. A second pair of relay contacts comprising an armature 14a and fixed contacts 29 and 30, and an armature 14b and fixed contacts 31 and 32, are controlled in operation by the relay energizing winding 14. A third pair of relay contacts comprising an armature 15a and fixed contacts 33 and 34, and an armature 15b and fixed contacts 35 and 36, are controlled in operation by the relay energizing winding 15. A fourth pair of relay contacts comprising an armature 16a and fixed contacts 37 and 38, and an armature 16b and fixed contacts 39 and 40, are controlled in operation by the relay energizing winding 16.

When the four relay windings 13, 14, 15 and 16 are deenergized, the relay contacts are in their positions shown in FIG. 2 and connect the brake lights wire 9 of the towing vehicle to both combination turn signal and brake wires 3 and 4 of the trailer. This is accomplished via the armatures 15a and 16a for the right turn signal and via the armatures 13a and 14a for the left turn signal.

A right turn signal in the right turn signal wire 7 of the towing vehicle energizes the relay energizing winding 15 to move the relay armatures 15a and 15b into electrical contact with the fixed contacts 34 and 36, respectively. The electrical contact of the armature 15b with the fixed contact 36 causes the energization of the relay energizing winding 16, so that the relay armatures 16a and 16b are moved into electrical contact with the fixed contacts 38 and 40, respectively. The energization of the winding 15 closes a circuit which connects the right turn signal wire 7 of the towing vehicle to the combination right turn signal and brake wire 3 of the trailer and the energization of the winding 16 disconnects the brake lights wire 9 of the towing vehicle from the combination right turn signal and brake wire of the trailer.

A left turn signal in the left turn signal wire 8 of the towing vehicle energizes the relay energizing winding 13 to move the relay armatures 13a and 13b into electrical contact with the fixed contacts 26 and 28, respectively. The electrical contact of the armature 13b with the fixed contact 28 causes the energization of the relay energizing winding 14, so that the relay armatures 14a and 14b are moved into electrical contact with the fixed contacts 30 and 32, respectively. The energization of the winding 13 closes a circuit which connects the left turn signal wire 8 of the towing vehicle to the combination left turn signal and brake wire 4 of the trailer and the energization of the winding 14 disconnects the brake lights wire 9 of the towing vehicle from the combination left turn signal and brake wire of the trailer.

While the invention has been described by means of a specific example and in a specific embodiment, I do not wish to be limited thereto, for obvious modifications will occur to those skilled in the art without departing from the spirit and scope of the invention.

I claim:

1. An automotive trailer light adapter for adapting an automotive trailer having a four wire tail light configuration having a running lights wire, a trailer ground wire, a combination right turn signal and brake wire and a combination left turn signal and brake wire to a towing vehicle having a five wire tail light configuration having a running lights wire, a chassis ground wire, a right turn signal wire, a left turn signal wire and a brake lights wire, said adapter comprising a lead for connecting a running lights wire of a towing vehicle to a running lights wire of a trailer;

a ground lead for connecting a chassis ground wire of the vehicle to a trailer ground wire of the trailer; and relay means connecting a right turn signal wire of the vehicle, a left turn signal wire of the vehicle and a brake lights wire of the vehicle to a combination right turn signal and brake wire of the trailer and a combination left turn signal and brake wire of the trailer, said relay means comprising four relay energizing windings each having one end connected to the ground lead, the other end of one of the windings being connected to the right turn signal wire, the other end of another of the windings being connected to the left turn signal wire, and four pairs of double pole double throw relay contacts each pair being controlled in operation by a corresponding one of the windings.

2. An automotive trailer light adapter as claimed in claim 1, wherein when the four relay windings are de-energized, the relay contacts connect the brake lights wire of the towing vehicle to both combination turn signal and brake wires of the trailer.

3. An automotive trailer light adapter as claimed in claim 2, wherein a right turn signal in the right turn signal wire of the towing vehicle energizes the one of the windings to move the relay contacts controlled by said one of said windings to connect the right turn signal wire of the towing vehicle to the combination right turn signal and brake wire of the trailer and to disconnect the brake lights wire of the towing vehicle from the combination right turn signal and brake wire of the trailer.

4. An automotive trailer light adapter as claimed in claim 3, wherein a left turn signal in the left turn signal wire of the towing vehicle energizes the other of the windings to move the relay contacts controlled by said other of said windings to connect the left turn signal wire of the towing vehicle to the combination left turn signal and brake wire of the trailer and to disconnect the brake lights wire of the towing vehicle from the combination left turn signal and brake wire of the trailer.

* * * * *